(No Model.)
J. WHERRY, Jr.
PULVERIZING HARROW.
No. 329,606. Patented Nov. 3, 1885.
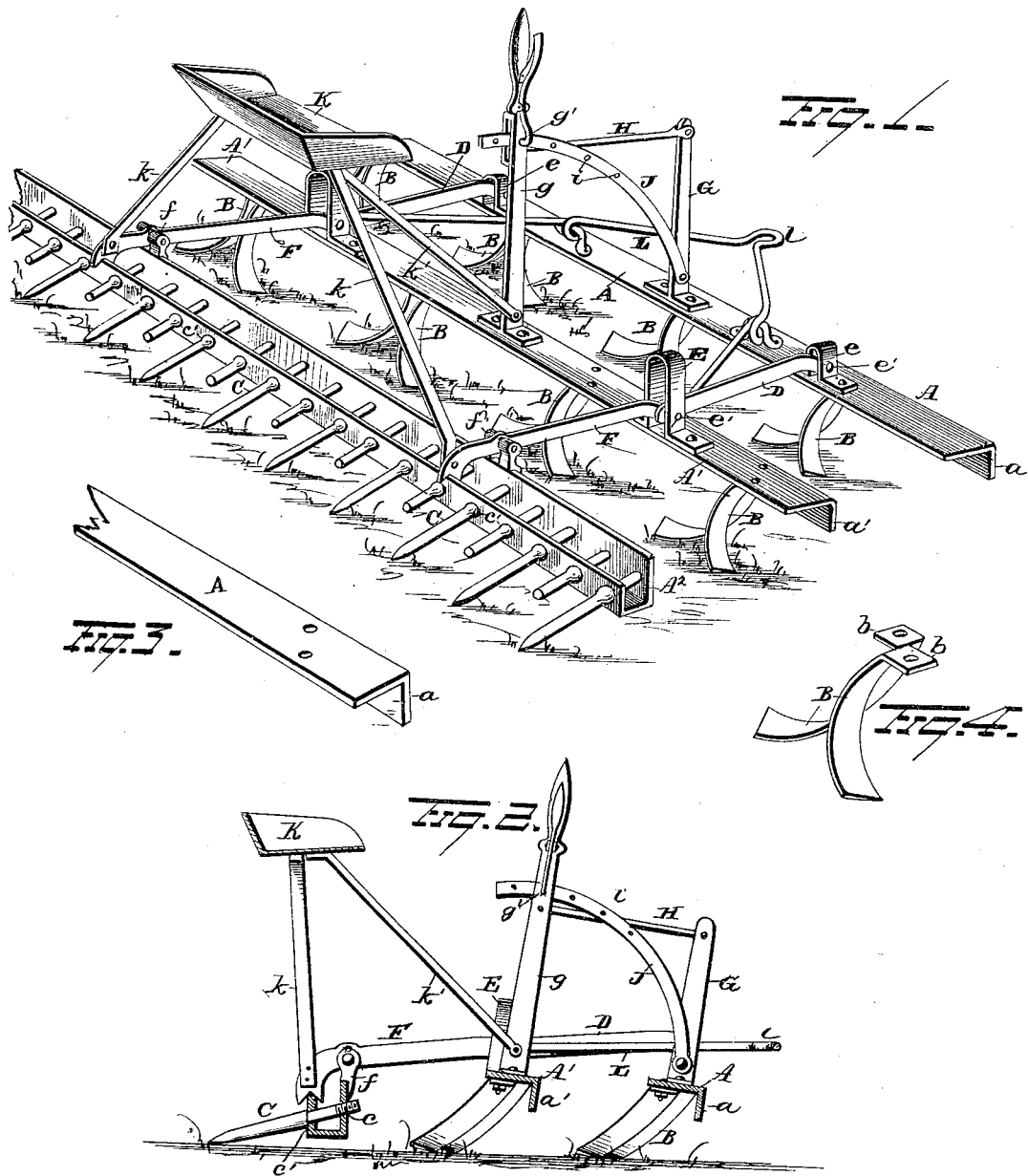
WITNESSES
INVENTOR

UNITED STATES PATENT OFFICE.

JOHN WHERRY, JR., OF PUTNAM, ILLINOIS.

PULVERIZING-HARROW.

SPECIFICATION forming part of Letters Patent No. 329,606, dated November 3, 1885.

Application filed January 29, 1885. Serial No. 154,284. (No model.)

*To all whom it may concern:*

Be it known that I, JOHN WHERRY, Jr., of Putnam, in the county of Putnam and State of Illinois, have invented certain new and useful Improvements in Pulverizing-Harrows; and I do hereby declare the following to be a full, clear, and exact description of the invention, such as will enable others skilled in the art to which it appertains to make and use the same.
My invention relates to an improvement in pulverizing-harrows, the object of the same being to provide a harrow of light draft, which shall effectually cut and crush the clods, thoroughly stir up and pulverize the soil, and leave the latter level and in good condition to receive seed and cause it to grow rapidly; a further object being to provide a harrow in which the knives or teeth shall be of such shape that they will clear themselves in ground strewn with litter or in clayey soil, and to further provide simple means for adapting the depth of cut of the knives and teeth; a further object being to provide an economical, durable, and effective harrow for general use;
and with these ends in view my invention consists in certain features of construction and combinations of parts, as will be hereinafter described, and pointed out in the claims.

In the accompanying drawings, Figure 1 is a view of the harrow in perspective. Fig. 2 is a vertical section through the center from front to rear; and Figs. 3 and 4 are detached views of the knife-beam and one of the knives, respectively.
The harrow-frame consists, preferably, of three parallel beams at right angles to the line of draft, connected together in such a manner as to allow the beams a rocking motion. The two beams nearest the front are provided with knives and the rear beam with teeth. The number of parallel beams is not, however, necessarily limited to three, as four or more might be connected and operated in a similar manner.
A and A' represent the first and second beams, respectively. They may be constructed of wood or metal. If constructed of metal, the front edges, $a$ and $a'$, are bent under, as shown, to lead any trash or manure which may lie on the surface beneath the knives and prevent clogging. The turned-under edges also prevent the fronts of the beams from dipping into the soil and producing a heavy draft.

To the under sides of the beams A A' are secured the knives B. The latter consist of oblong pieces of sheet metal sharpened along their lower edges and having the upper front corners, $b$, turned outwardly at right angles to the plate and perforated to receive bolts for securing the knives to the beams. The knives B are curved outwardly into the shape of plowshares, the curve being such that the knife will have a tendency to draw downwardly into the soil. The knives are arranged in symmetrical pairs, with the exception that one of the knives of each pair is located a little higher than its mate. The pairs on the second beam, A', track in the line of the spaces left between the pairs on the beam A, thus subjecting the entire surface of the ground to the action of the knives. The rear beam, A², may be of wood or metal. If constructed of metal, its rear and front edges are preferably turned upwardly, thereby giving the beam, when constructed of thin metal, strength to resist lateral strain, and affording convenient means for securing the teeth thereto. The front and rear upturned edges are provided with perforations $c$, adapted to receive the ends of the teeth C. The teeth C are preferably round, or nearly so, and pointed, every alternate tooth being short, to admit of a stone or stick or any obstacle which may be too large to slip between the teeth to pass between two long teeth without elevating the entire series. The upper ends of the teeth are preferably reduced, forming a shoulder, $c'$, which abuts against the rear upturned edge of the beam A², and the teeth are secured in their position either by having a screw-thread cut on their upper ends adapted to register with a similar thread in the perforations formed in the forward upturned edge of the beam, or by a nut fitting on the reduced end of the tooth and located between the upturned edges of the beam, or they may be keyed in position.

The beams A A' are connected by a pair of bars or rods, D, pivotally secured at their front and rear ends within a slotted standard, $e$ and E, respectively, by means of bolts $e'$. This construction permits either bar to rise and fall independently of the others. The forward ends of the bars D are bent downwardly, or the bars are cut away on their under sides to allow the beam A to rock freely.

The beams A' and A² are connected by means of bars or rods F, the forward ends of which are pivoted in the slotted standards E on the bolts e'. The said connecting-bars F are hinged near their rear ends between upwardly-projecting lugs f, secured to the front of the beam A²; while their rear ends curve downwardly and engage the rear upturned edge of the beam. The ends of the bars F, which engage the rear edge of the beam A², are preferably forked and straddle the edge, thereby acting as braces. The bars F are also provided with several perforations at the point where they are hinged to the beam, through any one of which the pivotal bolt may be made to pass, thereby determining the vertical angular adjustment of the beam. The forward ends of the bars F are also bent downwardly or cut away underneath, to allow the beam A' a free rocking motion.

The beams A A' occupy a normally-tilted position with their front edges depressed. They are provided with standards G g, centrally located thereon and extending upwardly at right angles to the upper faces of the beams. The said standards are connected by a link, H, loosely secured thereto at equal distances above the beams. A sector-bar, J, is secured at one end to the standard G, near its base, and extends rearwardly through a slot in the standard g. The sector-bar is provided with a series of perforations, i, which register with a perforation, g', in the standard g, and admit a pin or key for locking the standards, and hence the beams, in the desired vertical angular adjustment. The upper end of the standard g is shaped to form a handle, and is within easy reach of the driver when sitting on the seat K. The seat K is supported upon three legs. The rear legs, k, are formed, preferably, by bending a rod or bar of iron into the shape of an inverted U, with a flattened turn on which the rear of the seat is secured, and securing the ends of the rod or bar to the rear ends of the connecting-bars F. The front leg, k', is secured rigidly to the front of the seat and pivotally to the standard g near its base. The draft is attached to a loop, l, formed at the central portion of a rod, L, which projects forwardly V-shaped, and is hinged to the beam A on each side of the standard G, and from thence extends rearwardly, and is secured at its rear ends to the connecting-bars. The lever or standard g, when thrown forwardly, elevates the cutting-edges of the knives and causes them to cut shallow, and when drawn rearwardly causes them to cut deeper. The rearward motion of the standard g also tends to elevate the forward ends of the connecting-bars F, and thereby elevates the front edge of the rear beam, A²; the rear ends of the bars F bearing on the rear edge of the beam and preventing the beam from rocking. The weight of the driver is supported for the most part upon the rear beam, causing it to crush and pulverize the clods, and the knives which are attached to the forward beams are thus free to engage the clods and trash which lie on the surface, completely pulverizing them and fitting them for the action of the teeth B. The construction also admits of throwing the rear beam and driver's seat forwardly over the beam A' when it is desired to use the cutters alone or in going to and from the field. There is no tongue employed, which relieves the team from the annoyance often caused by switching or jerking from side to side.

It is evident that many slight changes may be resorted to in the construction and arrangement of the several parts without departing from the spirit and scope of my invention; hence I do not wish to limit myself strictly to the construction herein set forth; but, Having fully described my invention, what I claim as new, and desire to secure by Letters Patent, is—

1. In a harrow, the combination, with two beams having cutters thereon and bars pivoted to and forming loose connections between the beams, whereby one beam is permitted to rise and fall independently of the other, of a lever rigidly secured to one of said beams, a standard secured to the other beam, a link pivotally connecting the lever and standard, and a sector-bar pivotally secured to the standard and adjustably secured to the lever, all of the above parts combined substantially as set forth.

2. In a harrow, the combination, with two or more parallel beams provided with cutters or teeth, of bars pivotally connected to beams near the opposite ends thereof, whereby either beam is permitted to rise and fall independently of the others, each of said bars being provided with a series of perforations, substantially as set forth.

3. The combination, with parallel beams and bars connecting said beams, of a lever rigidly secured to the front beams, seat-legs secured, respectively, to the lever and to the connecting-bars at a point over the rear beam, and a seat secured to said legs.

4. The combination, with three parallel beams and bars loosely connecting said beams, of a standard secured to the front beam, a lever secured to the middle beam, a link connecting the lever and standard, devices for locking the beams against independent movement, seat-legs secured, respectively, to the lever and to the connecting-bars at a point over the rear beam, and a seat secured to said legs, substantially as set forth.

5. In a harrow, the combination, with a forward beam provided with cutters, of bars pivotally secured to the forward beam, and a rear beam provided with teeth and pivotally connected to the rear ends of the bars and adapted to rock independently of the forward beam, substantially as set forth.

6. In a harrow, the combination, with knife-beams, of a tooth-beam and bars pivotally connecting the knife-beams with the tooth-beam, the connecting-bars being hinged to the front edge of the tooth-beam and having a bearing against the rear edge thereof, whereby the tooth-beam is tilted simultaneously with the knife-beams, substantially as set forth.

7. In a harrow, the combination, with the knife-beams, of a tooth-beam located parallel therewith and connecting-bars pivotally connected to the beams and provided with perforations, whereby the tooth-beam can be adjusted vertically, substantially as set forth.

In testimony whereof I have signed this specification in the presence of two subscribing witnesses.

JOHN WHERRY, JR.

Witnesses:
WILLIAM L. KELSO,
DENNIS McEVOY.